US009367767B2

(12) United States Patent
Makino (10) Patent No.: US 9,367,767 B2
(45) Date of Patent: Jun. 14, 2016

(54) DATA PROCESSOR AND COMPUTER-READABLE NON-VOLATILE RECORDING MEDIUM FOR STORING PROGRAM FOR DATA PROCESSING

(71) Applicant: CASIO COMPUTER CO., LTD., Shibuya-ku, Tokyo (JP)

(72) Inventor: Tetsuji Makino, Ome (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 79 days.

(21) Appl. No.: 14/510,242

(22) Filed: Oct. 9, 2014

(65) Prior Publication Data
US 2015/0104108 A1 Apr. 16, 2015

(30) Foreign Application Priority Data

Oct. 11, 2013 (JP) .................................. 2013-213266

(51) Int. Cl.
*G06K 9/62* (2006.01)
*G06T 7/00* (2006.01)

(52) U.S. Cl.
CPC ............ *G06K 9/6267* (2013.01); *G06T 7/0065* (2013.01); *G06T 2207/10024* (2013.01)

(58) Field of Classification Search
CPC .................. G06F 9/6267; G06T 2207/10024; G06T 7/0065
USPC ........................................................ 382/225
See application file for complete search history.

(56) References Cited

U.S. PATENT DOCUMENTS

| 7,054,478 B2 * | 5/2006 | Harman | G06T 7/0022 345/419 |
| 2007/0273686 A1 * | 11/2007 | Watanabe | G06T 15/506 345/419 |

FOREIGN PATENT DOCUMENTS

| JP | 62067681 | 3/1987 |
| JP | 11-120374 | 4/1999 |
| JP | 2001-526477 | 12/2001 |
| JP | 2002-136519 | 5/2002 |
| JP | 2005-229189 | 8/2005 |
| JP | 2013-172214 | 9/2013 |

OTHER PUBLICATIONS

Japanese Office Action for Japanese Patent Application No. 2013-213266 mailed on Aug. 4, 2015.

* cited by examiner

*Primary Examiner* — Stephen R Koziol
*Assistant Examiner* — Shaghayegh Azima
(74) *Attorney, Agent, or Firm* — Amin, Turocy & Watson, LLP; Gregory Turocy (57) ABSTRACT

Provided is a data processor for generating three-dimensional image data from two-dimensional original image data, the three-dimensional image data including depth value, the apparatus comprising: a first clustering processor for dividing the two-dimensional original image data into a first plurality of clusters based on brightness; a three-dimensional data generating unit for setting a predetermined direction as a brighter-to-darker direction, and for generating information, as first depth information, such that depth value for a first cluster among the plurality of clusters is set to be larger than depth value for a second cluster which neighbors the first cluster and is located nearer to a starting point of the brighter-to-darker direction than the first cluster where the brightness of the first cluster is darker than the brightness of the second cluster.

16 Claims, 7 Drawing Sheets

TAKEN IMAGE

24a: SHADE DEPTH MAP

FIG. 5B

TAKEN IMAGE

24a: SHADE DEPTH MAP

FIG. 7

DATA PROCESSOR AND COMPUTER-READABLE NON-VOLATILE RECORDING MEDIUM FOR STORING PROGRAM FOR DATA PROCESSING

CROSS-REFERENCE TO RELATED APPLICATIONS

The present disclosure contains subject matter related to that disclosed in Japanese Priority Patent Application JP 2013-213266 filed in the Japan Patent Office on Oct. 11, 2013, the entire content of which is hereby incorporated by reference.

BACKGROUND OF THE INVENTION

1. Field of the Invention

The present invention relates to a data processor and a computer-readable non-volatile recording medium for storing a program for data processing.

2. Description of the Related Art

In a technology of forming a three-dimensional object that uses powered plaster or a foaming agent, there is a need for automatic generation of three-dimensional image data having a depth difference when there is only image data available that is not three-dimensional and extends in a two-dimensional direction. In order for three-dimensional image data to be automatically generated, there have been used the following two methods: One of them is a method of taking images of an object with a twin-lens reflex camera from different directions at one time and estimating data (depth difference) on the depth directions of the images by an operation; and the other is a method of taking images of an object in succession with different focus positions and estimating data on the depth directions of the images by an operation.

For example, JP 2005-229189 A discloses a technique that enables us to easily form a three-dimensional image that is excellent in three-dimensional expressive effects and has a depth difference varying depending on a feature amount such as the hue of an original image. According to the literature, the three-dimensional image data mentioned above includes depth value for the pixels, and the depth value is set based on the hue of the original image data.

BRIEF SUMMARY OF THE INVENTION

The existing techniques, however, are disadvantageous, in that the techniques sometimes fail to form an object as deep as an actual object since limitations are imposed on depths to be expressed in some of the methods employed for forming a three-dimensional object. Further, with the technique disclosed in the above literature, since depths and hues are simply correlated with each other and a dark color corresponds to a receding color, for example, an object is always expressed as if it existed at a relatively distant position and this is not sometimes consistent with the visual recognition of a human.

According to the present invention, there is provided a data processor for generating three-dimensional image data from two-dimensional original image data, the three-dimensional image data including depth value, the apparatus including: a first clustering processor for dividing the two-dimensional original image data into a first plurality of clusters based on brightness; a three-dimensional data generating unit for setting a predetermined direction as a brighter-to-darker direction, and for generating information, as first depth information, such that depth value for a first cluster among the plurality of clusters is set to be larger than depth value for a second cluster which neighbors the first cluster and is located nearer to a starting point of the brighter-to-darker direction than the first cluster where the brightness of the first cluster is darker than the brightness of the second cluster.

According to the present invention, there is further provided a computer readable non-transitory recording medium storing a program for processing data to generate three-dimensional image data from two-dimensional original image data, the three-dimensional image data including depth value, the program causing a computer to: dividing the two-dimensional original image data into a first plurality of clusters based on brightness; setting a predetermined direction as a brighter-to-darker direction; generating an information, as first depth information, such that depth value for a first cluster among the plurality of clusters is set to be larger than depth value for a second cluster which neighbors the first cluster and is located nearer to a starting point of the brighter-to-darker direction than the first cluster where the brightness of the first cluster is darker than the brightness of the second cluster.

DETAILED DESCRIPTION OF THE INVENTION

A mode for carrying out the present invention (hereinafter referred to as the embodiment) will be hereinafter described in detail with reference to accompanying drawings. In the following descriptions of the embodiment, components of substantially the same functions are designated by the same reference characters for easy description.

(Configuration of Embodiment)

Figure 1:
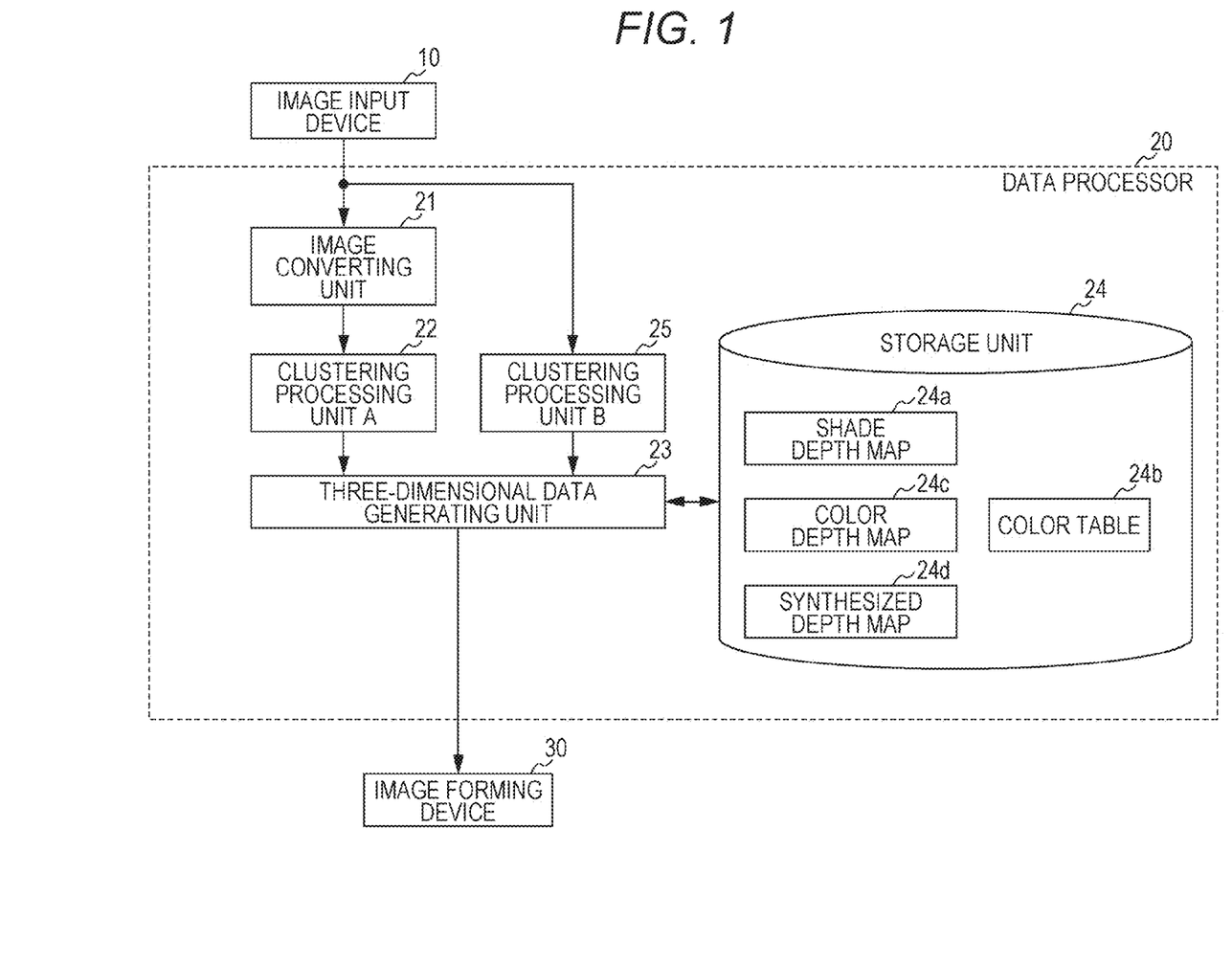
FIG. 1 is a block diagram illustrating a configuration of a data processor according to an embodiment of the present invention.

FIG. 1 shows that a data processor 20 according to the embodiment is connected to an image input device 10 and an image forming device 30, the image input device 10 acquiring a taken image from an image taking device or a recording medium, for example, and the image forming device 30 outputting a processed image based on three-dimensional image data generated by the data processor 20.

The data processor 20 according to the embodiment generates three-dimensional image data different in depth from an original image such as a taken image and outputs the data to the image forming device 30. In order to reproduce three-dimensional effects within a limited depth, the data processor 20 generates three-dimensional data by dividing a taken image into regions according to the brightness or hue and setting the depth value for a dark region (shade) below a bright region to be large or setting the depth value for a region in a receding color to be large.

For the purpose of generating three-dimensional data as described above, the data processor 20 according to the embodiment is formed to include an image converting unit 21, a clustering processing unit A(22), a three-dimensional data generating unit 23, and a storage unit 24. The data processor 20 may additionally include a clustering processing unit B(25).

The image converting unit 21 captures an original image such as a taken image from the image input device 10, and converts the captured image into an image expressed in a gray-scale gradation, and outputs the converted image to the clustering processing unit A(22). The clustering processing unit A(22) executes clustering processing according to the brightness on the image expressed in the gray-scale gradation output from the image converting unit 21, and outputs the image to the three-dimensional data generating unit 23. Note that the "clustering processing according to the brightness" means processing of dividing an image (a whole series of pixels) as a division target into groups according to the brightness. The groups formed after the division are called clusters. More specifically, the entire range of values that the brightness can take is divided into a plurality of sub-ranges (brightness groups), and a brightness group is determined for each pixel based on the brightness value of the pixel. If pixels next to one another belong to the same brightness group, the pixels form clusters connected to spread in two dimensions. The number of the brightness groups may be, but is not limited to, larger than two or three and not larger than ten, for example.

The three-dimensional data generating unit 23 compares the brightness levels with respect to a predetermined direction of the clusters formed after the division by the clustering processing unit A(22), specifies a cluster that changes its brightness from a high level to a low level, creates a shade depth map 24a (each dot of the shade depth map 24a is represented by depth value) on which the specified cluster has a depth set to be larger than the depth of a cluster as a basis for comparison, and outputs the map 24a to the image forming device 30. More specifically, if a cluster is selected as a cluster to be paid attention to (hereinafter referred to as a noted cluster) and the noted cluster has a lower level of brightness than a cluster next to the noted cluster near a starting point of the predetermined direction, the depth of the noted cluster is set to be larger than those of the clusters surrounding the noted clusters on the map 24a.

The clustering processing unit B(25) executes clustering processing according to the hue on an original image, and outputs the image to the three-dimensional data generating unit 23. The three-dimensional data generating unit 23 creates a surrounding cluster color table 24b for each of the clusters formed after the division by the clustering processing, specifies a cluster that changes its color from an advancing color to a receding color based on the relation with the surrounding colors, creates a color depth map 24c (each dot of the color depth map 24c is represented by depth value) on which the specified cluster has a depth set to be larger than that of a cluster as a basis for comparison, and outputs the map 24c to the image forming device 30. More specifically, if a cluster is selected as a noted cluster and the noted cluster has a receding color and the clusters surrounding the noted cluster have an advancing color, the depth of the noted cluster is set to be larger than those of the surrounding clusters on the map 24c.

The three-dimensional data generating unit 23 performs overlaying processing (synthesizing process) on the shade depth map 24a (first depth information) and the color depth map 24c (second depth information) to create a synthesized depth map 24d. Further, the three-dimensional data generating unit 23 either normalizes depth information obtained from the synthesized depth map 24d to a gray level such that the image forming device 30 can reproduce the depth information and outputs the depth information, or normalizes the depth information shown on the shade depth map 24a (first depth information) and the color depth map 24c (second depth information) to gray levels such that the image forming device 30 can reproduce the depth information, and then synthesizes and outputs the depth information. The three-dimensional data generating unit 23 may synthesize the shade depth map 24a (first depth information) and the color depth map 24c (second depth information) so that the map 24a is synthesized in a larger ratio by weight than the map 24c.

While the image converting unit 21, the clustering processing unit A(22), the three-dimensional data generating unit 23, and the clustering processing unit B(25) in the above descriptions are independent units individually provided, the present invention is not limited to that configuration and may be configured so that the functions of the units 21, 22, 23, and 25 are carried out in a manner that a processor sequentially reads out programs stored in the storage unit 24.

In that case, the storage unit 24 is provided with, for storage, not only a program region storing programs but also an operational data region storing different types of data generated at execution of the programs. The operational data region stores items that are necessary for generation of three-dimensional data, which are the shade depth map 24a, the color table 24b, the color depth map 24c, and the synthesized depth map 24d, for example. The maps and the table will be described later in detail.

First Embodiment

Figure 3:
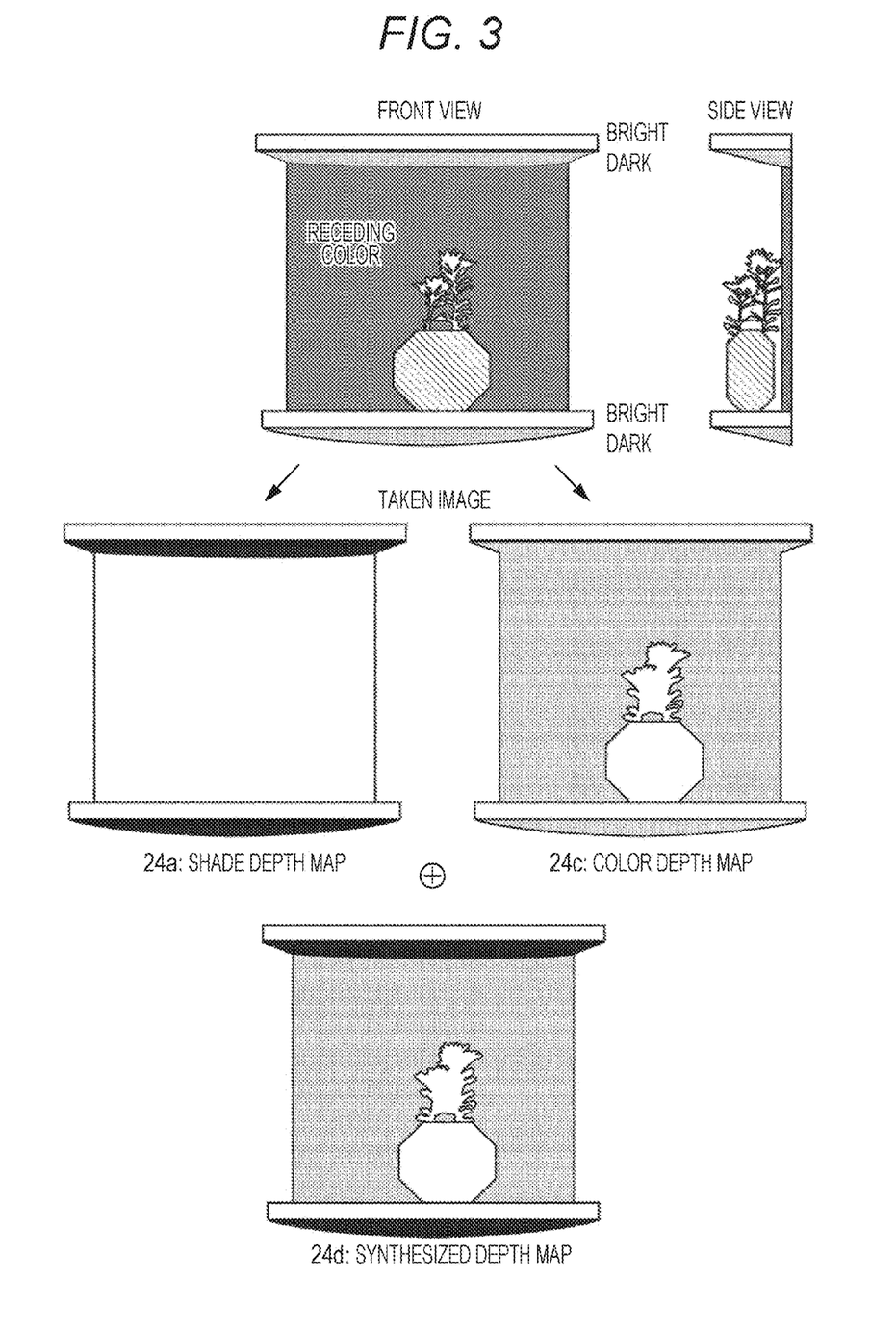
FIG. 3 is a diagram schematically illustrating an image of generation of three-dimensional data according to First Embodiment.
Figure 4A:
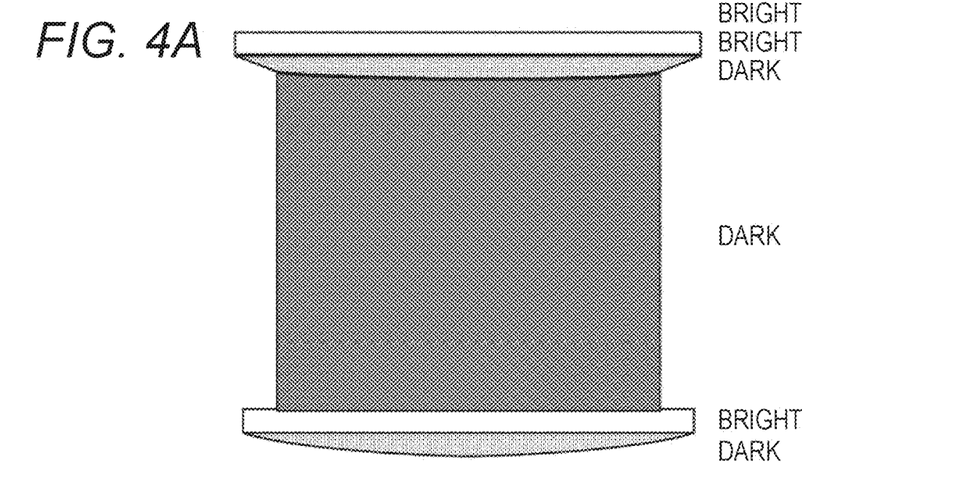
FIGS. 4A to 4C are diagrams cited for describing the influences of a shade and a hue on a taken image according to First Embodiment.
Figure 4B:
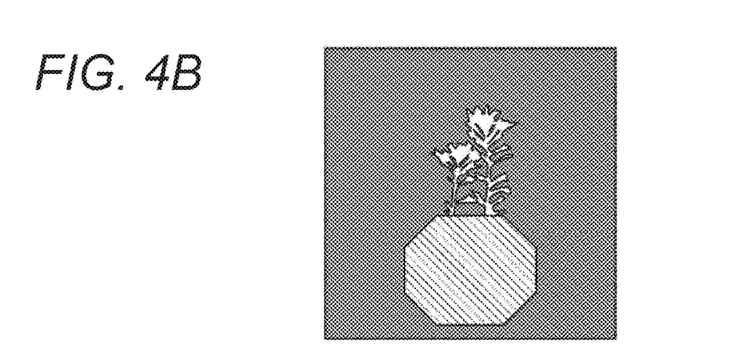
Figure 4C:
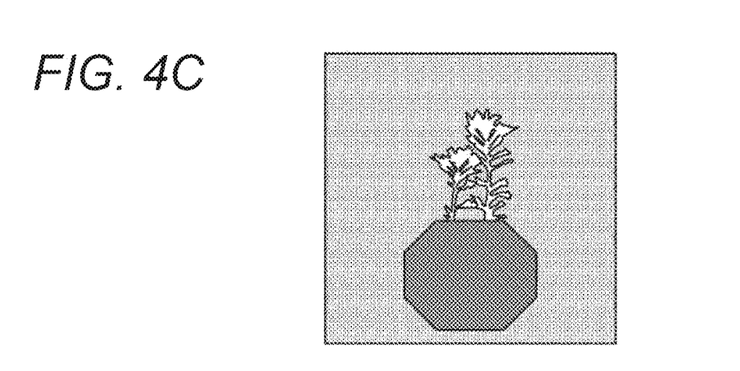

The operations of the data processor 20 according to First Embodiment will be described in detail with reference to the flow chart of FIG. 2 and the schematic diagrams of FIGS. 3 to 5.

In the data processor 20 according to First Embodiment, the image converting unit 21 converts a two-dimensional original image such as a taken image captured from the image input device 10 into an image expressed in a gray-scale gradation, and outputs the image to the clustering processing unit A(22). The taken image used in the embodiment is an image of a vase with flowers on a display shelf, as shown in FIG. 3. As is clear from the drawing, the object actually has a thickness in a depth direction, as shown in the side view. The clustering processing unit A(22) executes clustering processing according to the brightness on the front view of the image expressed in the gray-scale gradation output from the image converting unit 21, and outputs the front view to the three-dimensional data generating unit 23 (Step S101: brightness clustering).

The three-dimensional data generating unit 23 compares the brightness levels with respect to a predetermined direction (from the top to the bottom in the embodiment) of the clusters formed after the division by the clustering processing unit A(22), and specifies a cluster that changes its brightness from a high level to a low level (Step S102: acquisition of a vertical relation between brightness clusters). Further, the three-dimensional data generating unit 23 creates the shade depth map 24a on which the specified cluster has a depth set to be larger than that of a cluster as a basis for comparison (Step S103: the shade depth map creation). In the example of FIG. 3, the vase, flowers, and background are the same in brightness (have brightness values smaller than a predetermined threshold value) and are therefore the same in depth on the shade depth map 24a. The top and bottom boards of the display shelf are shaded in part and are therefore different in brightness (have brightness values larger than the predetermined threshold value), which causes a certain degree of difference in the depth on the map 24*a*.

The "acquisition of a vertical relation between brightness clusters" in Step S102 will be described in detail with reference to FIG. 4A and FIGS. 5A and 5B. FIG. 4A shows the influence of a shade on the visual recognition of a human, and FIGS. 5A and 5B show exceptional patterns of the influences of a shade. In the real world, the light source (sun) is normally located immediately above our heads, and we easily develop an illusion that a dark region below a bright region is a shade. In other words, we tend to confuse a bright region that lies over a dark region with a bright region extending forward. In order to deal with the illusion, the three-dimensional data generating unit 23 compares the brightness levels from the top to the bottom. In this embodiment, differences in the brightness are caused on the top and bottom boards of the display shelf since the boards are shaded in part. Further, no particular difference in brightness is found among the background of the display shelf, the flowers, and the vase. Hence, in the depth information set for the shade depth map 24*a* created by the three-dimensional data generating unit 23, the depth of a cluster that has changed the brightness level is set to be larger than that of a cluster as a basis for comparison.

Figure 5A:
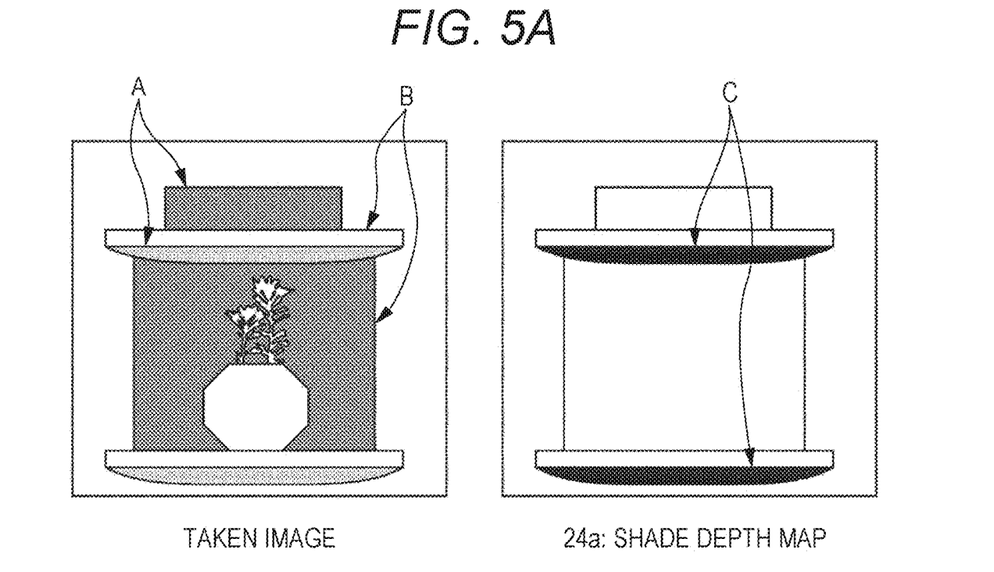
FIGS. 5A and 5B are diagrams cited for describing an exceptional pattern of the three-dimensional data generation according to First Embodiment.
Figure 5B:
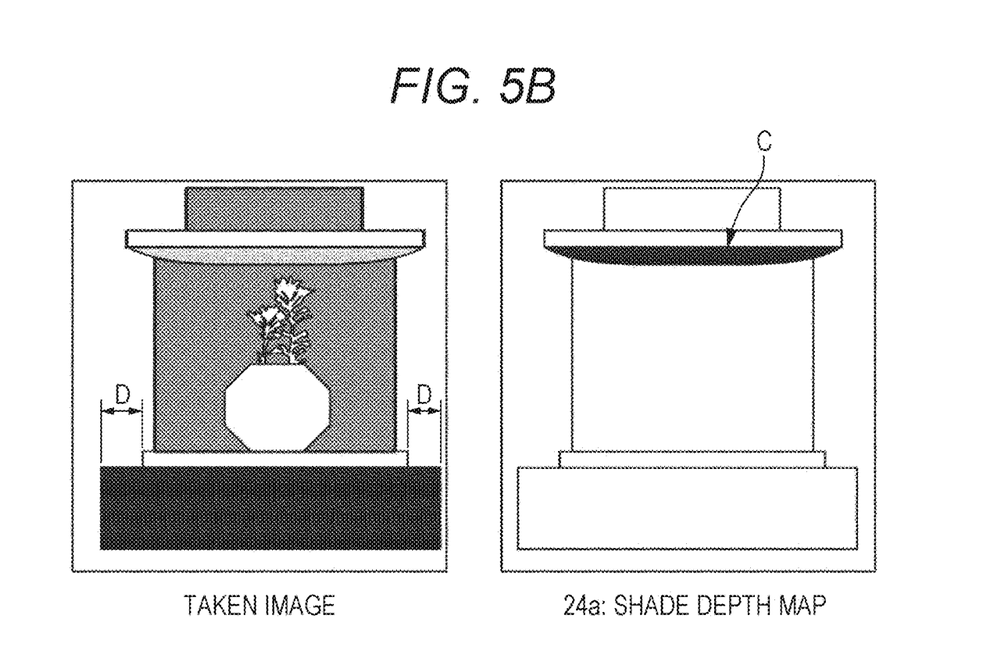

As shown by A in the taken image of FIG. 5A, a bright cluster and a dark cluster located above the bright cluster are determined to be the same in the depth and the dark cluster is not therefore recognized as a shade. Likewise, a bright cluster and a dark cluster located below the bright cluster are determined to be the same in the depth if the dark cluster is surrounded by the bright cluster, and the dark cluster is not therefore recognized as a shade under the above condition. Further, as shown by D in the taken image of FIG. 5B, a bright cluster and a dark cluster located below the bright cluster are determined to be the same in the depth if the upper and lower clusters have different widths (the upper cluster has a smaller width than the lower cluster in the case of D), and the dark cluster is not therefore recognized as a shade under the above condition. In the above cases, the upper and lower clusters are the same in the depth on the shade depth map 24*a*. On the other hand, as shown by C in FIGS. 5A and 5B, the region below the top board of the display shelf is recognized as a shade because in the region a bright cluster and a dark cluster below the bright cluster have the same width, without surrounding by brightness clusters. The depth information for the region is set to be large on the shade depth map 24*a*.

The flow chart in FIG. 2 will be described again. After the three-dimensional data generating unit 23 has created the shade depth map in Step S103, the clustering processing unit B(25) executes clustering processing according to the hue on the original image, and outputs the image to the three-dimensional data generating unit 23 (Step S104). Since a determination of an advancing color or a receding color is made depending on the difference in the degree of a warm color or a cold color with a surrounding color, the three-dimensional data generating unit 23 makes the determination by creating the color table 24*b* for clusters surrounding divided clusters (noted clusters) (Step S105). Specifically, with reference to the color table 24*b*, the three-dimensional data generating unit 23 makes a determination of an advancing color or a receding color for each noted cluster based on the relation with the surrounding colors (Step S106) and creates the color depth map 24*c* with a depth difference reflecting the difference in the degree of a warm color or a cold color with the surrounding clusters based on the determination of the advancing color or the receding color (Step S107).

The color depth map creation processing in Step S107 will be described in detail with reference to FIGS. 4B and 4C. FIGS. 4B and 4C show the influence of a hue on the three-dimensional recognition of a human. In other words, FIGS. 4B and 4C show changes in the illusion of colors and the influence of chromostereopsis according to surrounding colors. For example, if the background is blue and the vase is red in FIG. 4B, the red vase corresponds to an advancing color in the chromostereopsis, thereby causing a depth difference in the outline. Further, if the background is orange and the vase is blue in FIG. 4C, the vase looks as if it existed at an innermost position of the shelf due to the influence of the chromostereopsis, thereby causing a depth difference in the outline. Hence, on the color depth map 24*c* created by the three-dimensional data generating unit 23, the part which is seen at the back in the depth direction is set to be large. For example, in a part which changes its color from an advancing color to a receding color on the color depth map 24*c* created by the three-dimensional data generating unit 23 shown in FIG. 3, the depth information for a cluster in a receding color is set to be large.

In the end, the three-dimensional data generating unit 23 performs overlaying processing on the shade depth map 24*a* and the color depth map 24*c* to create the synthesized depth map 24*d*. Further, the three-dimensional data generating unit 23 obtains synthesized depth information (small in a bright part and large in a dark part) from the map 24*d*, and normalizes the synthesized depth information to a gray level (for example, 0 to 255) such that the image forming device 30 can reproduce the synthesized depth information (Step S108). This is the end of a series of processing for generating three-dimensional data. Since the shade depth map 24*a* and the color depth map 24*c* have small parts (close to white) expressed with small values, the three-dimensional data generating unit 23 creates the synthesized depth map 24*d* by overlaying processing that performs simple addition of the values or performs conversion of the values into values obtained by multiplying the respective depths for a shade and a color by a gain and then addition of the values.

Alternatively, the three-dimensional data generating unit 23 may first normalize the shade depth map 24*a* and the color depth map 24*c* to gray levels (for example, 0 to 255) such that the image forming device 30 can reproduce the maps 24*a* and 24*c*, and then perform the overlaying processing. It is to be noted that the three-dimensional data generating unit 23 may prioritize the shade depth map 24*a* over the color depth map 24*c* in overlaying the shade depth map 24*a* and the color depth map 24*c* on each other. For example, the shade depth map 24*a* and the color depth map 24*c* may be overlaid on each other so that the depth information shown on the shade depth map 24*a* is overlaid in a larger ratio (ratio by weight) than the depth information on the color depth map 24*c*.

Second Embodiment

The operations of the data processor 20 according to Second Embodiment will be hereinafter described in detail with reference to the flow chart of FIG. 6 and the schematic diagram of FIG. 7.

Figure 2:
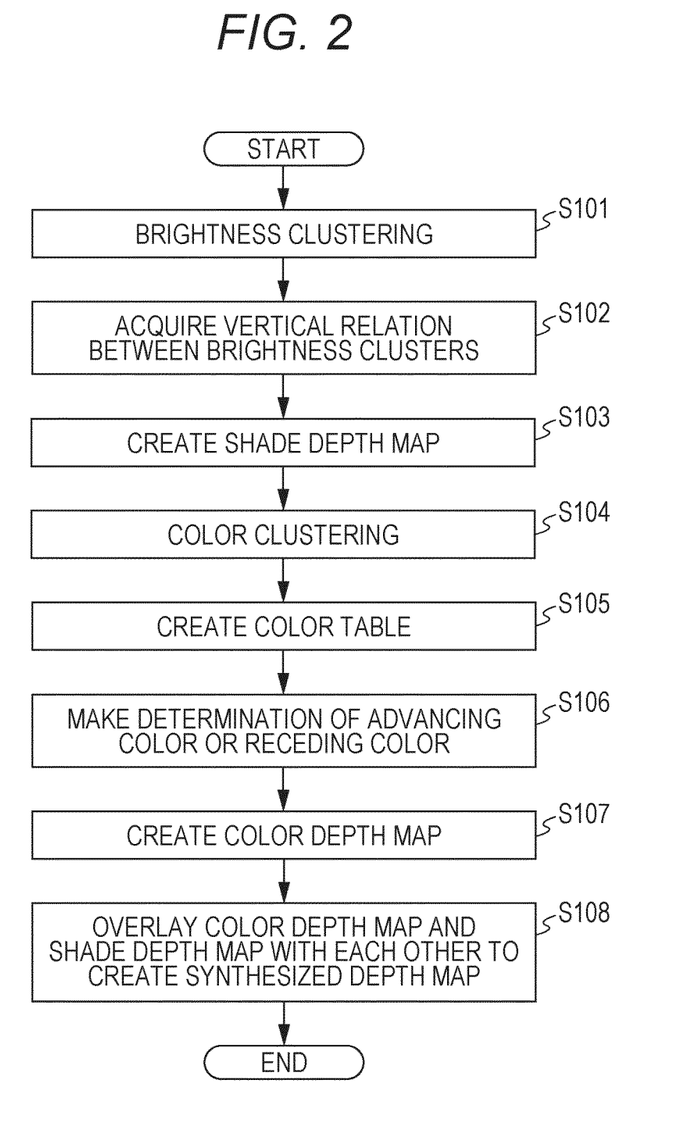
FIG. 2 is a flow chart illustrating an operation according to First Embodiment.
Figure 6:
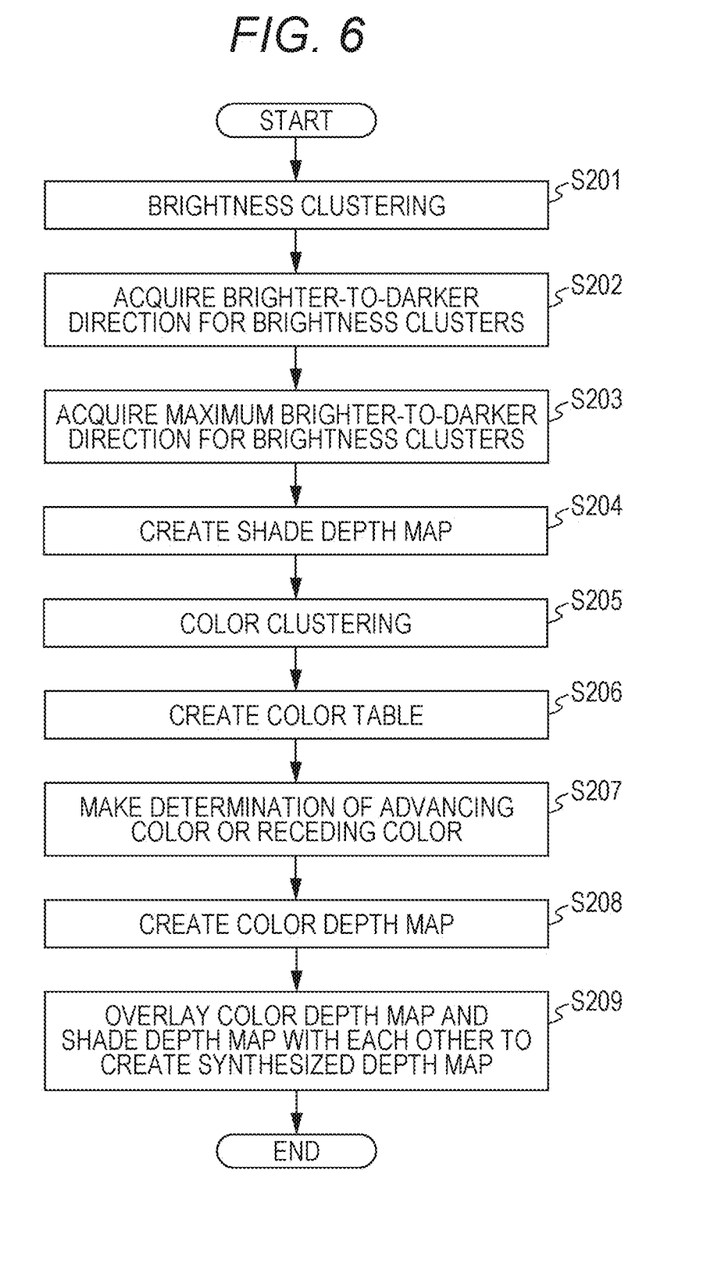
FIG. 6 is a flow chart illustrating an operation according to Second Embodiment.

Second Embodiment shown in FIG. 6 is different from First Embodiment shown in FIG. 2 in that the three-dimensional data generating unit 23 in Second Embodiment acquires a brighter-to-darker direction for each of brightness clusters (Step S202) and further acquires a maximum brighter-to-darker direction for brightness clusters (Step S203), and creates the shade depth map 24*a* based on the acquired directions (Step S204) while the three-dimensional data generating unit 23 in First Embodiment acquires a vertical relation between brightness clusters and creates the shade depth map 24a based on the acquired direction, thereby expressing depth information (Step S102 and Step S103). The processing subsequent to the above processing in Second Embodiment is the same as in First Embodiment, the subsequent processing including performing the color clustering processing so that the table 24b for the surrounding colors is created to make a determination of an advancing color or a receding color, thereby creating the color depth map 24c, and overlaying the maps 24a and 24c on each other to create the synthesized depth map (Step S205 to Step S209).

Figure 7:
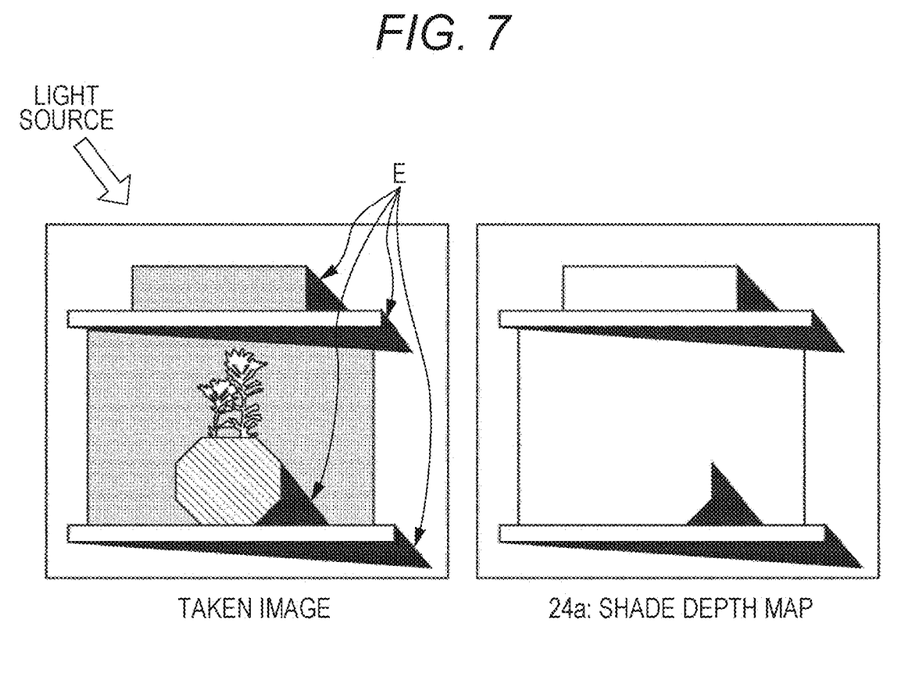
FIG. 7 is a diagram cited for describing the influence of a shade on a taken image according to Second Embodiment.

FIG. 7 illustrates a taken image and the shade depth map 24a when the light source exists in an oblique direction and shades extend in a direction other than a vertical direction. When the light source exists in an oblique direction as shown by E in the taken image, a plurality of sets of a bright cluster and a dark cluster in the same positional relation (from the upper left to the lower right in FIG. 7) are detected in Steps S202 and S203. In that case, a shade extending in a direction other than a vertical direction is recognized as a shade and is reflected on the shade depth map 24a. The widths of the upper and lower clusters are corrected in the light-to-dark direction detected. This means that a length along a direction perpendicular to the detected direction is used as the width of the clusters. Hence, the three-dimensional data generating unit 23 acquires from the clustering processing unit A(22) clusters formed by dividing the region according to the brightness, acquires the brighter-to-darker direction, acquires the maximum brighter-to-darker direction among brightness clusters, and creates the shade depth map 24a based on the acquired directions (Step S204). More specifically, the brightness levels are compared between a noted cluster and a cluster next to the noted cluster, and if the comparison result shows that the noted cluster is darker than the neighboring cluster, the light source is supposed to exist near a starting point of a direction from the neighboring cluster to the noted cluster and the direction is set to be the brighter-to-darker direction. Moreover, the same determination as above is made on a plurality of sets of a noted cluster and a cluster next to the noted cluster. If a noted cluster and a neighboring cluster have the same brighter-to-darker direction, the direction is counted up and a brighter-to-darker direction (maximum brighter-to-darker direction) where the total of counted values reaches a maximum is acquired, and the shade depth map 24a is created based on the acquired brighter-to-darker direction. The operations subsequent to the above operation are the same as in First Embodiment.

With the data processor 20 according to the embodiment, it becomes possible to generate three-dimensional data that is consistent with the visual recognition of a human, by comparing the brightness levels with respect to a predetermined direction of the clusters formed after the division by the clustering processing, specifying a cluster that changes its brightness from a high level to a low level, and creating first depth information (the shade depth map 24a) on which the specified cluster has a depth set to be larger than that of a cluster as a basis for comparison. Further, it becomes possible as well to emphasize the outline in the expression, by comparing the hues of the clusters formed after the division by the clustering processing with the surrounding clusters, specifying a cluster that changes its color from an advancing color to a receding color, and creating second depth information (the color depth map 24c) on which the specified cluster has a depth set to be larger than that of a cluster as a basis for comparison. In this way, there can be achieved reproduction of the stereoscopic vision effects within a limited depth, thereby making up for shortage of a three-dimensional amount. Further, there can be additionally achieved formation of a three-dimensional object that is consistent with monocular three-dimensional data acquired from one image.

Moreover, with the data processor 20 according to the embodiment, it becomes possible to generate three-dimensional data that is further consistent with the visual recognition of a human, either by overlaying the first depth information (shade depth map 24a) and the second depth information (color depth map 24c) on each other and synthesize the information with each other to obtain synthesized depth information (synthesized depth map 34d), normalizing the obtained depth information to a gray level such that the image forming device 30 can reproduce the depth information, and outputting the depth information, or by after normalizing the first and second depth information at gray levels such that the image forming device 30 can reproduce the depth information, synthesizing and outputting the normalized depth information. In the generation of the three-dimensional data described above, the stereoscopic vision effects can be emphasized by synthesizing the first and second depth information so that the first depth information is synthesized in a larger ratio than the second depth information.

Further, with the data processor 20 according to the embodiment, it becomes possible to generate three-dimensional data using a light source not only in an upper direction but also in an oblique direction, by acquiring a brighter-to-darker direction for brightness clusters and creating the shade depth map 24a, or by acquiring a vertical relation between brightness clusters and creating the shade depth map 24a.

(Modified Example)

In First and Second Embodiments, if a cluster is selected as a noted cluster and the noted cluster has a receding color and the clusters surrounding the noted cluster have an advancing color, the depth of the noted cluster is set to be larger than those of the surrounding clusters on the map 24c. It is to be noted that the present invention is not particularly limited to that configuration and may be configured so that the depth of a noted cluster is set to be smaller than those of the clusters surrounding the noted cluster on the map 24c if the noted cluster has an advancing color and the surrounding clusters have a receding color.

While the preferable embodiments of the present invention have been described in detail, the technical field of the present invention is not limited to that described with reference to the embodiments. It is obvious for those skilled in the art that various changes or modifications may be made to the embodiments. Further, it is obvious as well from the recitations of the claims that the embodiments can be included in the technical field of the present invention if the embodiments have been changed or modified.

What is claimed is:

1. A data processor for generating three-dimensional image data from two-dimensional original image data, the three-dimensional image data including depth value, the apparatus comprising:
   a first clustering processor for dividing the two-dimensional original image data into a first plurality of clusters based on brightness;
   a three-dimensional data generating unit for setting a predetermined direction as a brighter-to-darker direction, and for generating information, as first depth information, such that depth value for a first cluster among the plurality of clusters is set to be larger than depth value for a second cluster which neighbors the first cluster and is located nearer to a starting point of the brighter-todarker direction than the first cluster where the brightness of the first cluster is darker than the brightness of the second cluster; and
a second clustering processor for dividing the two-dimensional original image data into a second plurality of clusters based on hue; wherein
the three-dimensional data generating unit for generating information, as second depth information, such that depth value for a first cluster among the plurality of clusters is set to be larger than depth value for a fourth cluster neighboring the first cluster where the first cluster is a receding color and the fourth cluster is an advancing color.

2. The data processor according to claim 1, wherein
the three-dimensional data generating unit generates information, as the first depth information, such that depth value for the first cluster equals to depth value for a third cluster which neighbors the first cluster and is located nearer to a ending point of the high-to-low direction than the first cluster where the brightness of the first cluster is darker than the brightness of the third cluster.

3. The data processor according to claim 1, wherein
the three-dimensional data generating unit generates information, as the first depth information, such that depth value for the first cluster equals to depth value for the second cluster where the first cluster and the second cluster have different width in a direction perpendicular to the brighter-to-darker direction.

4. The data processor according to claim 1, wherein
the three-dimensional data generating unit for generating information, as the first depth information, such that depth of the first cluster equals to depth of the second cluster where the second cluster surrounds the first cluster.

5. The data processor according to claim 1, further comprising:
a second clustering processor for dividing the two-dimensional original image data into a second plurality of clusters based on hue; wherein
the three-dimensional data generating unit for generating information, as second depth information, such that depth value for a first cluster among the plurality of clusters is set to be smaller than depth value for a fourth cluster neighboring the first cluster where the first cluster is an advancing color and the fourth cluster is a receding color.

6. The data processor according to claim 1, wherein
the three-dimensional data generating unit executes an comparing process for comparing the brightness of the first cluster and the second cluster for each of a plurality of pairs of the first cluster and the second cluster, a determining process for determining a direction from a brighter cluster to a darker cluster among the first cluster and the second cluster for each of the pairs of the clusters, an incrementing process for incrementing a number corresponding to a coinciding direction for number of times of coinciding if the coinciding direction obtained in the determining process for one of the plurality of pairs coincides to another coinciding direction obtained in the determining process for another of the plurality of pairs, a setting process for setting the direction corresponding to the most incremented number obtained in the incrementing process as the brighter-to-darker direction.

7. The data processor according to claim 1, wherein
the three-dimensional data generating unit sets a direction from an upper side of the original image to a lower side thereof as the brighter-to-darker direction.

8. The data processor according to claim 1, wherein the three-dimensional data generating unit further executes a synthesizing process for synthesizing the first depth information and the second depth information to obtain synthesized depth information, and a normalization process for normalizing the synthesized depth information.

9. The data processor according to claim 5, wherein
the three-dimensional data generating unit further executes a synthesizing process for synthesizing the first depth information and the second depth information to obtain synthesized depth information, and a normalization process for normalizing the synthesized depth information.

10. The data processor according to claim 1, wherein the three-dimensional data generating unit further executes a normalizing process normalizing each of the first depth information and the second depth information to obtain the first normalized depth information and the second normalized depth information, and synthesizing process synthesizing the first normalized depth information and the second normalized depth information.

11. The data processor according to claim 9, wherein
the three-dimensional data generating unit executes the synthesizing process for synthesizing the first depth information and the second depth information so that the first depth information is larger than the second depth information in ratio.

12. The data processor according to claim 5, wherein
the three-dimensional data generating unit further executes a normalizing process normalizing each of the first depth information and the second depth information to obtain the first normalized depth information and the second normalized depth information, and synthesizing process synthesizing the first normalized depth information and the second normalized depth information.

13. The data processor according to claim 12, wherein
the three-dimensional data generating unit executes the synthesizing process for synthesizing the first depth information and the second depth information so that the first depth information is larger than the second depth information in ratio.

14. A computer readable non-transitory recording medium storing a program for processing data to generate three-dimensional image data from two-dimensional original image data, the three-dimensional image data including depth value, the program causing a computer to:
dividing the two-dimensional original image data into a first plurality of clusters based on brightness;
setting a predetermined direction as a brighter-to-darker direction;
generating an information, as first depth information, such that depth value for a first cluster among the plurality of clusters is set to be larger than depth value for a second cluster which neighbors the first cluster and is located nearer to a starting point of the brighter-to-darker direction than the first cluster where the brightness of the first cluster is darker than the brightness of the second cluster; and
dividing the two-dimensional original image data into a second plurality of clusters based on hue; wherein
generating information, as second depth information, such that depth value for a first cluster among the plurality of clusters is set to be larger than depth value for a fourth cluster neighboring the first cluster where the first cluster is a receding color and the fourth cluster is an advancing color.

15. A data processor for generating three-dimensional image data from two-dimensional original image data, the three-dimensional image data including depth value, the apparatus comprising:

a first clustering processor for dividing the two-dimensional original image data into a first plurality of clusters based on brightness;

a three-dimensional data generating unit for setting a predetermined direction as a brighter-to-darker direction, and for generating information, as first depth information, such that depth value for a first cluster among the plurality of clusters is set to be larger than depth value for a second cluster which neighbors the first cluster and is located nearer to a starting point of the brighter-to-darker direction than the first cluster where the brightness of the first cluster is darker than the brightness of the second cluster; and a second clustering processor for dividing the two-dimensional original image data into a second plurality of clusters based on hue; wherein the three-dimensional data generating unit for generating information, as second depth information, such that depth value for a first cluster among the plurality of clusters is set to be smaller than depth value for a fourth cluster neighboring the first cluster where the first cluster is an advancing color and the fourth cluster is a receding color.

16. A computer readable non-transitory recording medium storing a program for processing data to generate three-dimensional image data from two-dimensional original image data, the three-dimensional image data including depth value, the program causing a computer to:

dividing the two-dimensional original image data into a first plurality of clusters based on brightness;

setting a predetermined direction as a brighter-to-darker direction;

generating an information, as first depth information, such that depth value for a first cluster among the plurality of clusters is set to be larger than depth value for a second cluster which neighbors the first cluster and is located nearer to a starting point of the brighter-to-darker direction than the first cluster where the brightness of the first cluster is darker than the brightness of the second cluster; and dividing the two-dimensional original image data into a second plurality of clusters based on hue; wherein generating information, as second depth information, such that depth value for a first cluster among the plurality of clusters is set to be smaller than depth value for a fourth cluster neighboring the first cluster where the first cluster is an advancing color and the fourth cluster is a receding color.

* * * * *